Patented July 10, 1928.

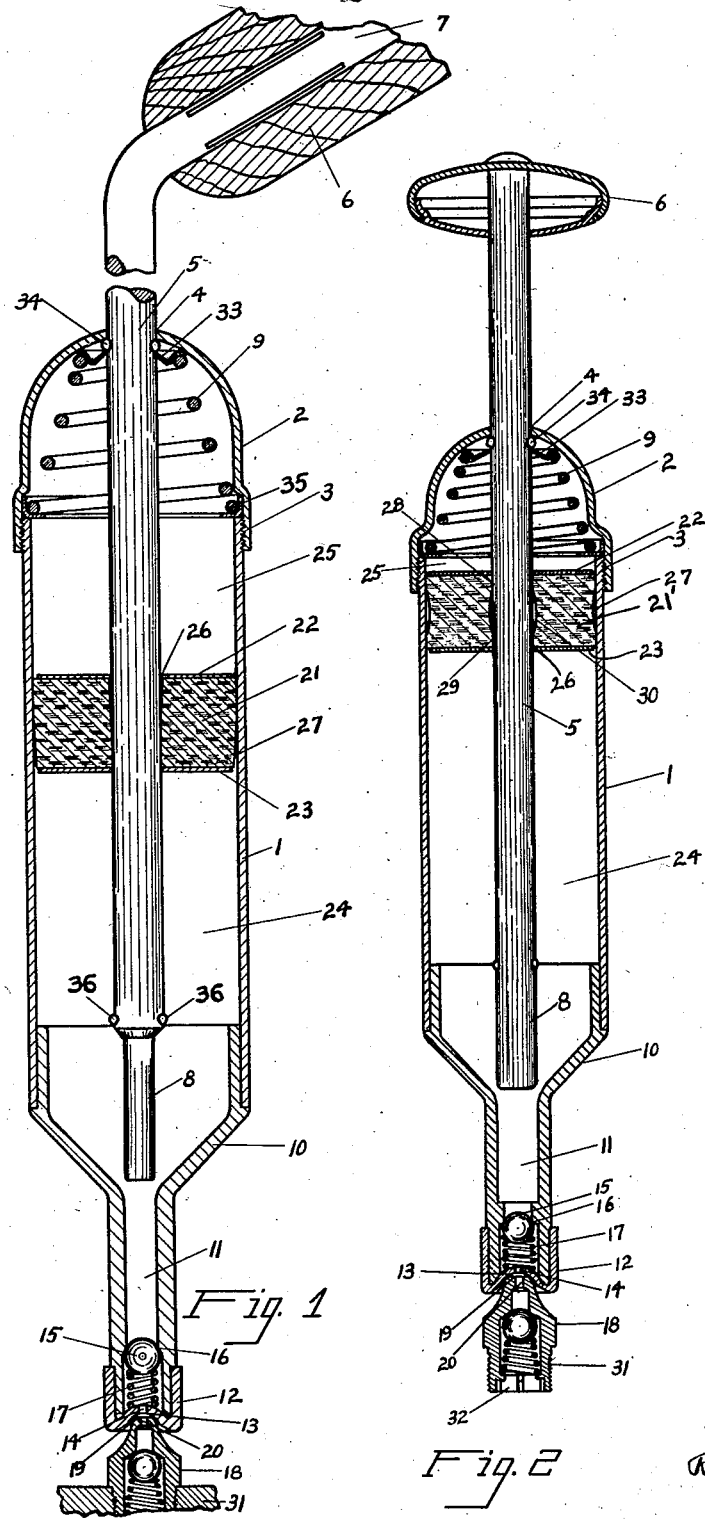

1,676,626

UNITED STATES PATENT OFFICE.

OSCAR ULYSSES ZERK, OF CHICAGO, ILLINOIS, ASSIGNOR, BY MESNE ASSIGNMENTS, TO THE BASSICK MANUFACTURING COMPANY.

LUBRICATING-DISPENSING APPARATUS.

Application filed January 2, 1924, Serial No. 683,971. Renewed March 12, 1926.

My invention relates to lubricant dispensing apparatus and more particularly to a lubricating dispensing apparatus, such as is adapted to contain a small amount of lubricant, and which may be manually operated, from time to time, for the purpose of lubricating bearing surfaces, such as upon automobiles or other machinery.

This application is a continuation in part of my co-pending application, Serial No. 649,702, filed July 5, 1923, for automatic grease gun.

An object of the present invention is to provide a lubricating apparatus which will be compact, efficient in operation, and inexpensive to manufacture.

Another object of my invention is to provide a lubricating apparatus which is capable of injecting lubricant to the bearing surfaces of such machinery under very high pressure, the same being accomplished with a minimum of effort on the part of the user.

Another object of my invention is to provide such an apparatus, wherein the lubricant containing reservoir may be very readily opened for the purpose of recharging the same.

Another object of my invention is to provide a lubricant dispensing apparatus which may be employed alike for the dispensing of grease or oil of various consistencies.

Other objects of my invention and the invention itself will become apparent as the description thereof herein progresses.

Referring to the drawings, Fig. 1 shows a longitudinal medial sectional view of a lubricant dispensing apparatus, embodying the principles of my invention, certain parts being shown in my specification. Fig. 2 shows a small view of a second embodiment of my invention.

Referring now to the drawings in both figures, of which like parts are designated by like reference characters, at 1 T show a cylinder carrying a dome shaped cap 2, screw threaded on the upper end thereof at 3 and having an opening to receive a plunger rod 5, said plunger rod carrying a handle 6 on a bent end portion 7 thereof, and being preferably of reduced cross section at its other end, as shown at 8, said plunger normally taking the position shown in Fig. 1, under the force of the compression spring 9.

The other end of the cylindrical barrel 1 is closed by a head element 10 reduced at 11 to form a cylindrical portion, positioned to receive the plunger rod. The rod end 8 is a close fit in chamber 11.

At the end of the cylindrical chamber 11, I provide a nozzle cap 12 having a spherical convex contact face 13, the same being perforated at 14 for the discharge of lubricant from the cylindrical chamber 11, the passageway therefrom being normally closed by a ball check 15 spring pressed against a seat 16 by a compression spring 17.

A lubricant receiving nipple is shown at 18, the same having its contact face 19 of reduced diameter and preferably flat and of circular outline, the circular edge of the nipple contact face being adapted to make fluid tight contact with the spherical face of the nozzle, so that lubricant may be communicated through opening 14 of the nozzle and into the opening 20 of the nipple, when the lubricant dispensing apparatus is operated as below described.

Embracing the rod 5, I show a free piston follower, comprising preferably a cork intermediate portion 21 and annular, preferably metal, washers 22 and 23, on either side of the annular cork element 21, the whole being freely slidable in sealing contact with the barrel 1 and the piston 5. The cork element 21 is relied upon to prevent the passage of lubricant from the lubricant retaining reservoir 24, ahead of the free piston and on the nozzle side thereof, to the rear compartment 25, being somewhat compressed against the inner walls of the cylinder 1 and against the outer surface of the rod 5, so as to maintain a substantially lubricant-proof contact therewith. I have found that a better seal may be obtained with less friction if the cork 21 engages the walls of the rod and barrel over only a portion of its surface. Thus in Figure 1 the outer surface 27 is slightly tapered with the end next the lubricant smallest, and the inner surface 26 is slightly tapered in the other direction. In Figure 2 there is contact at the top and bottom but an intermediate belt is slightly cut away. Different modes of reducing the contact areas may be employed on different elements or on the outer and inner surfaces of the same element.

The gun of my invention may be operated as follows:

The lubricant receiving nipple 18, screw threaded, as shown, into a bearing casing 31, is adapted to receive a charge of lubricant, such as oil or grease, contained in the cylindrical chamber 11, by the operator grasping a handle 6 and pushing the same forwardly toward the nipple 18, so as to force the plunger portion 8 into the chamber 11 and trap and displace the lubricant contained therein, the check valve 5 being displaced from its seat 6 by the resilient pressure. When the pressure is then relieved, the spring 9 will return the parts to initial position. Check valve 15 closes on the return stroke and the vacuum developed in chamber 11 will forcibly refill the chamber as soon as plunger 8 passes beyond the end of the chamber.

This refilling draws the free piston down due to atmospheric pressure entering at joint 4 to the space above the piston.

It will be noted that the spring 9 is conical and engages a washer element 33, resting on the topmost turn and engaging the lugs 34, extending outwardly from the rod 5, said lugs engaging the inner surface of the dome 2 to limit movement of the plunger 5. The lower end of the spring engages a cup shaped washer element 35 seated between the upper edge of the receptacle 1 and a shoulder on the cap 2. The free piston may be removed from the barrel by merely detaching the cap therefrom, lugs 36 engaging the piston to pull it out with rod 5.

I prefer to merely place the washers 22 and 23 in contact with the cork element 21 and rely on the lubricant to keep them in place.

Without further elaboration, the foregoing will so fully explain the gist of my invention, that others may, by applying current knowlege readily adapt the same for use under various conditions of service, without eliminating certain features which may properly be said to constitute the essential items of novelty involved, which items are intended to be defined and secured to me by the following claims.

I claim:

1. A lubricant compressor comprising a barrel, an exit at one end thereof, means acting on the material adjacent said exit for expelling lubricant therefrom, and a follower for bearing on the remote end of a mass of lubricant in said barrel to move it to the exit under atmospheric pressure exerted against the remote side of said follower, the surface adjacent the wall of said barrel having contact with said barrel wall over a portion only of said follower surface.

2. A lubricant compressor comprising a barrel, an exit at one end thereof, means extending axially through said barrel for expelling lubricant from said exit, and an annular follower for bearing on a mass of lubricant in said barrel at the end remote from said exit to push the entire mass toward the exit under the action of atmospheric pressure when material is withdrawn at said exit, the surface adjacent the wall of said barrel having contact with said barrel wall over a portion only of said follower surface.

3. A lubricant compressor comprising a barrel, an exit at one end thereof, means extending axially through said barrel for expelling lubricant from said exit, and an annular follower for bearing on a mass of lubricant in said barrel at the end remote from said exit to push the entire mass toward the exit under the action of atmospheric pressure when material is withdrawn at said exit, the surface of said follower adjacent the wall of said expelling means having contact with said wall over a portion only of said follower surface.

4. A lubricant compressor comprising a barrel, an exit at one end thereof, means extending axially through said barrel for expelling lubricant from said exit, and an annular follower for bearing on a mass of lubricant in said barrel at the end remote from said exit to push the entire mass toward the exit under the action of atmospheric pressure when material is withdrawn at said exit, the surfaces of said follower adjacent the walls of said barrel and expelling means having contact with said walls over portions only of said follower surfaces.

5. A lubricant compressor comprising a barrel, an exit at one end thereof, means acting on the material adjacent said exit for expelling lubricant therefrom, and a follower for bearing on the remote end of a mass of lubricant in said barrel to move it to the exit under atmospheric pressure exerted against the remote side of said follower, the surface of said follower adjacent the barrel wall having contact with said barrel wall over a portion only of said follower surface, said follower being held in axial alinement by said contact.

6. A lubricant compressor comprising a barrel, an axially slidable plunger extending through said barrel for ejecting lubricant at one end thereof under high pressure, an annular follower encircling said plunger for forcing a mass of lubricant toward the exit end of said barrel, said plunger being removable from said barrel, and means for drawing said follower out with said plunger.

7. A lubricant compressor comprising a barrel, an axially slidable high-pressure plunger extending through said barrel for ejecting lubricant at one end thereof, an annular follower encircling said plunger for forcing a mass of lubricant toward the exit end of said barrel, said plunger being removable from said barrel, means for drawing said follower out with said plunger, a cap at the withdrawal end of said barrel, and a return spring for said plunger housed in said cap.

8. A lubricant compressor comprising a barrel, an axially slidable plunger extending through said barrel for ejecting lubricant at one end thereof, an annular follower encircling said plunger for forcing a mass of lubricant toward the exit end of said barrel, said plunger being removable from said barrel, means for drawing said follower out with said plunger, a cap at the withdrawal end of said barrel, and a return spring for said plunger housed in said cap, the end edge of said barrel forming an abutment for taking the thrust at one end of said spring.

9. A lubricant compressor comprising a barrel, an axially slidable plunger extending through said barrel for ejecting lubricant at one end thereof, an annular follower encircling said plunger for forcing a mass of lubricant toward the exit end of said barrel, said plunger being removable from said barrel, means for drawing said follower out with said plunger, a cap at the withdrawal end of said barrel, a return spring for said plunger housed in said cap, and a ring in said cap abutting the end edge of said barrel and forming a socket for the base of said spring.

10. A lubricant compressor comprising a barrel, a plunger extending through said barrel for ejecting the contents at one end, an annular non-metallic follower encircling said plunger and having sliding contact with said plunger and said barrel, and annular metallic face plates covering the ends of said follower, said face plates lying in contact with said follower but being otherwise unattached thereto.

11. A lubricant compressor comprising a barrel, means for ejecting the contents at one end, a non-metallic follower having sliding contact with said barrel, and metallic face plates covering the end of said follower, said face plates lying in contact with said follower but being otherwise unattached thereto.

12. A lubricant dispensing apparatus comprising a receptacle, a movable wall dividing said receptacle into two non-communicating compartments, one of said compartments providing a lubricant reservoir and the other of said compartments being open to atmosphere, a discharge conduit communicating with said reservoir compartment, a self-closing valve within said conduit, and a slidable plunger extending through said wall into said reservoir compartment, the movement of said plunger shutting off communication between said conduit and said reservoir and forcibly ejecting the lubricant therein therefrom, said conduit being automatically re-filled by resultant differential fluid pressure created in the two compartments when said plunger is subsequently removed therefrom, said wall being moved responsive thereto.

13. A lubricating apparatus comprising a receptacle, a movable piston dividing said receptacle into two non-communicating compartments, one of said compartments serving as a lubricant reservoir and the other of said compartments containing a fluid maintained at a substantially constant pressure, a cylinder having a passage in communication with the reservoir, a valve for automatically closing the passage in said cylinder, a manually operated plunger, a handle therefor, said handle and plunger being disposed on opposite sides of said piston, said plunger being movable so as to effect the closure of the passage between said reservoir and cylinder, and forcibly eject lubricant contained within said cylinder therefrom when said plunger is moved by its handle to telescope said plunger and cylinder, said passage being reopened when said plunger is removed from the cylinder and said cylinder automatically refilled with lubricant from the reservoir by the fluid pressure exerted on the non-reservoir side of the piston.

14. A lubricant dispensing apparatus comprising a receptacle, a movable piston dividing said receptacle into two compartments, one of said compartments acting as a lubricant reservoir and the other of said compartments having an opening to atmosphere through its wall, a rigid discharge nozzle secured to and normally in open communication with said reservoir compartment, a self-closing valve within said nozzle, and a plunger extending through said receptacle and piston and having a portion in alignment with said nozzle, said plunger being movable into said nozzle to trap lubricant therein and forcibly eject the same therefrom, the retraction of the plunger creating differential pressures in said compartments acting automatically to move the piston to cause lubricant to be forced into said nozzle, due to said differential pressure only.

15. A lubricant dispensing apparatus comprising a receptacle, a slidable free piston dividing said receptacle into two compartments, one of said compartments providing a lubricant reservoir and the other of said compartments being open to atmosphere, a rigid nozzle secured to said lubricant compartment having a passage therethrough communicating with said compartment, a rigid outlet connector rigidly secured to the end of said nozzle, said connector having a passage extending therethrough, a spring pressed valve normally closing the passage through said nozzle and connector, and a manually slidable plunger for trapping lubricant within said nozzle and forcibly ejecting the same through the passages in said nozzle and connector, the retraction of the plunger creating a difference of pressure in the two compartments to fill the nozzle with lubricant from said lubricant compartment when said piston is moved by the higher atmospheric pressure in the other of said compartments.

16. A lubricant dispensing apparatus having two communicating axially arranged lubricant compartments, one of said compartments serving as a lubricant reservoir, and the other as a conduit for feeding lubricant to a lubricant receiving element, a freely slidable lubricant follower in said reservoir compartment, means including a plunger axially reciprocable within and relative to said conduit compartment, the movement of said plunger relative to said conduit compartment causing lubricant to enter and be ejected from said compartment under pressure, and means at the end of said reservoir remote from said conduit compartment for manually actuating said plunger.

17. A lubricant dispensing apparatus having two communicating axially arranged lubricant compartments, one of said compartments serving as a lubricant reservoir, and the other as a conduit for feeding lubricant to a lubricant receiving element, a freely slidable lubricant follower in said reservoir compartment, means including a plunger axially reciprocable within and relative to said conduit compartment, the movement of said plunger relative to said conduit compartment causing lubricant to enter and be ejected from said compartment under pressure, and means separate and distinct from said reservoir and located at the end of said reservoir remote from said conduit compartment for manually actuating said plunger.

18. A lubricant dispensing apparatus having a reservoir compartment, a conduit compartment secured in alignment and communicating with said reservoir compartment, said conduit compartment having a discharge outlet at its free end, a removable cap for the free end of said reservoir compartment, a rod extending through said cap and removable therewith, a free piston follower reciprocably mounted upon said rod within said reservoir compartment, and a plunger carried by said rod end reciprocable relative to said conduit compartment for causing lubricant to enter and to be ejected therefrom under pressure.

19. An apparatus, for dispensing lubricant under pressure to a lubricant receiving element, comprising a reservoir compartment, a conduit compartment communicating with said reservoir compartment and having a discharge outlet, a compressible piston freely slidable in said reservoir compartment and exerting fluid sealing pressure against the inner wall thereof, and means including a plunger reciprocable relative to said conduit compartment for causing lubricant to enter and to be ejected from said conduit compartment under pressure.

20. An apparatus, for dispensing lubricant under pressure to a lubricant receiving element, comprising a reservoir compartment, a conduit compartment communicating with said reservoir compartment and having a discharge outlet, a compressible piston within said reservoir compartment having an opening axially therethrough, a rod extending through the opening in said piston, said piston being freely slidable on said rod and exerting fluid sealing pressure against said rod and the inner wall of said reservoir compartment, and means including a plunger on the end of said rod reciprocable relative to said conduit reservoir for causing lubricant to enter and to be ejected from said conduit compartment under pressure.

21. A lubricant compressor comprising a lubricant containing barrel having a discharge conduit at one end, a detachable cap at the other end of said barrel, a central plunger extending through said cap and barrel for forcing the contents of said barrel out of said discharge conduit, and a free annular follower in said barrel and surrounding said plunger.

22. A lubricant compressor comprising a barrel, a removable cap closing one end of said barrel, a cylinder at the other end of said barrel, means carried by the outer end of said cylinder for making sealed connection with a fitting, a plunger extending through said cap, the inner end of said plunger being reciprocable in said cylinder, and a piston slidable on said plunger, said piston fitting the cylinder walls so as to be forced down by atmospheric pressure above it upon withdrawal of the lubricant below it.

23. A lubricant compressor comprising a lubricant containing barrel having a discharge conduit at one end, a detachable cap at the other end of said barrel, a central plunger extending through said cap and barrel for forcing the contents of said barrel out of said discharge conduit, and a spring housed entirely in said cap beyond the end of said barrel for returning said plunger, said spring comprising helical coils of decreasing diameter so that it can be compressed to a flat spiral.

24. A lubricant compressor comprising a lubricant containing barrel having a discharge conduit at one end, a detachable cap at the other end of said barrel, a central plunger extending through said cap and barrel for forcing the contents of said barrel out of said discharge conduit, a follower piston slidable in said barrel and a spring housed entirely in said cap for returning said plunger.

In testimony whereof I hereunto affix my signature this 29th day of December, 1923.

OSCAR ULYSSES ZERK.

CERTIFICATE OF CORRECTION.

Patent No. 1,676,626.                          Granted July 10, 1928, to

OSCAR ULYSSES ZERK.

It is hereby certified that error appears in the printed specification of the above numbered patent requiring correction as follows: Page 3, line 42, claim 11, for the word "end" read "ends"; and that said Letters Patent should be read with this correction therein that the same may conform to the record of the case in the Patent Office.

Signed and sealed this 7th day of August, A. D. 1928.

(Seal)

M. J. Moore,
Acting Commissioner of Patents.